(12) United States Patent
Zhang et al.

(10) Patent No.: US 9,463,803 B2
(45) Date of Patent: Oct. 11, 2016

(54) METHOD AND APPARATUS FOR UNIFORM ACCESS OF ONBOARD DEVICES

(75) Inventors: Qingshan Zhang, Shanghai (CN); Guoxia Zhang, Shanghai (CN); Zeng Yang, Shanghai (CN)

(73) Assignees: Harman International (China) Holdings Co., LTD, Shanghai (CN); Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/410,037

(22) PCT Filed: Jun. 29, 2012

(86) PCT No.: PCT/CN2012/077955
§ 371 (c)(1),
(2), (4) Date: Dec. 19, 2014

(87) PCT Pub. No.: WO2014/000284
PCT Pub. Date: Jan. 3, 2014

(65) Prior Publication Data
US 2015/0191175 A1    Jul. 9, 2015

(51) Int. Cl.
| | | |
|---|---|---|
| *G06F 7/00* | (2006.01) | |
| *B60W 40/02* | (2006.01) | |
| *H04L 29/08* | (2006.01) | |
| *B60W 40/08* | (2012.01) | |
| *B60W 40/10* | (2012.01) | |

(52) U.S. Cl.
CPC .............. *B60W 40/02* (2013.01); *B60W 40/08* (2013.01); *B60W 40/10* (2013.01); *H04L 67/12* (2013.01)

(58) Field of Classification Search
CPC ... G06F 15/16; G06F 15/167; B60R 16/023; B60W 40/02; B60W 40/08; B60W 40/10
See application file for complete search history.

(56) References Cited

U.S. PATENT DOCUMENTS

2005/0021860 A1* 1/2005 Kelly .................. H04L 12/4625
                                                                 709/246
2010/0312835 A1   12/2010 Garay et al.

FOREIGN PATENT DOCUMENTS

| CN | 1607774 A | 4/2005 |
|---|---|---|
| CN | 2932844 Y | 8/2007 |
| CN | 101888380 A | 11/2010 |

OTHER PUBLICATIONS

ISA State Intellectual Property Office of the People's Republic of China, International Search Report and Written Opinion Issued in International Application No. PCT/CN2012/077955, Apr. 11, 2013, WIPO, 12 pages.

*Primary Examiner* — Michael D Lang
(74) *Attorney, Agent, or Firm* — Alleman Hall McCoy Russell & Tuttle LLP

(57) ABSTRACT

A method and an apparatus for an application uniformly accessing a plurality of onboard devices of a vehicle are provided. The method includes registering the plurality of devices by assigning each device a device ID; when an application sends a message in a uniform format to at least one device of the plurality of devices, determining an address of each of the at least one device, determining a format of each of the at least one device based on the device ID, translating the message into the format of each of the at least one device, and sending the translated message to the corresponding device of the at least one device. The present disclosure provides a solution which enables applications to access all kinds of onboard devices uniformly, even these devices are made by different manufacturers and each has its specific device driver.

20 Claims, 4 Drawing Sheets example of the uniform format

* MT=1(Infor Request)/2(Infor Response)/3(Read Request)/
  4(Read Response)/5(Control Request)/6(Control Response)...

type 1.1

* Feed back information of all onboard devices if DN=0 type 1.2 type 2

* DT=1(Sensor)/2(Controller)/...
* DS=0(Inactive)/1(Active)/...

type 3 type 4 type 5 type 6

*SR=0(Fail)/1(Success)/...

METHOD AND APPARATUS FOR UNIFORM ACCESS OF ONBOARD DEVICES

CROSS REFERENCE TO RELATED APPLICATIONS

The present application is a U.S. National Phase of International Patent Application Serial No. PCT/CN2012/077955 entitled "METHOD AND APPARATUS FOR UNIFORM ACCESS OF ONBOARD DEVICES," filed on Jun. 29, 2012, the entire contents of which are hereby incorporated by reference for all purposes.

FIELD OF INVENTION

The present disclosure relates to access of onboard devices in a vehicle, and more particularly, relates to a method and an apparatus for uniform access of a plurality of onboard devices.

BACKGROUND

Nowadays, vehicles have more and more onboard devices, which make vehicles more comfortable and easier to operate. The onboard devices generally include two kinds of devices, i.e., sensors and controllers. Sensors are used for monitoring both inside and outside environment of the vehicle, such as speedometer, fuel meter, radar, GPS devices, etc. Controllers may be operated by drivers and/or passengers, to control vehicle equipment, such as, air-conditioner, power window, seat heater, camera, audio and video players, etc. It is expected more and more onboard devices (e.g., fingerprint sensors, humidity sensors) will be embedded into the vehicles in the future.

However, various onboard devices usually work independently because those devices are usually provided by different manufacturers, and thus they may have different drivers and different communication formats specified by corresponding drivers. Thus, at present, to access or control the onboard devices by the applications, it is necessary for the applications to know details of them, including their drivers, APIs, data exchange formats, etc. Further, the application developers need to learn all technical details of a large number of onboard devices in order to access them correctly by using the applications, and the applications should be bound to specific devices. The applications may not work if some of these devices are upgraded or replaced. Moreover, an application may not be installed in different vehicles if they do not have the same onboard devices equipped.

In view of the above, there is a need for a solution which enables the applications to access onboard devices uniformly, even those onboard devices are made by different manufacturers and each has its specific device driver.

SUMMARY OF THE INVENTION

According to one aspect of the disclosure, a method for accessing a plurality of onboard devices in a vehicle is provided, which includes registering the plurality of devices by assigning each device a device ID; when an application sends a message in a uniform format to at least one device of the plurality of devices, determining an address of each of the at least one device, determining a format of each of the at least one device based on the device ID of each of the at least one device included in the message, translating the message into the format of each of the at least one device, and sending the translated message to the corresponding device of the at least one device.

The process of determining an address of each of the at least one device is performed based on the device ID by using a registration table, in which the device ID and the address of each of the plurality of devices are stored correspondingly with each other.

The method may further include receiving a return message from each of the at least one device, determining the device ID of each of the at least one device based on an address of each of the at least one device, determining the format of each of the at least one device based on the device ID, translating the return message of each of the at least one device into the uniform format, and sending the translated return message to the application.

In addition, the method may further include when one of the plurality of devices sends a message to an application, determining the device ID of the one device based on an address of the one device, determining a format of the message based on the device ID of the one device, translating the message into the uniform format, and sending the translated message to the application. The method may use a registration table, in which the device ID and the address of each of the plurality of devices are stored correspondingly with each other, to determining the device ID based on an address of the one device.

Furthermore, the method may include checking the plurality of devices to determine which is (are) active or inactive.

The uniform format may include a message type field and a payload field. The message sent from the application to the at least one device may be a device information request, a device read request, or a device control request, and the message sent from the one device to the application may be a device information response, a device read response, or a device control response, and different kinds of messages may have different payload fields.

The devices may include any of an air-conditioner controller, a power window controller, a seat heater controller, a camera controller, an audio and/or video player controller, a speedometer, a fuel meter, a radar, and a GPS device, or any device integrated in the vehicle. The application may be an application for controlling audio and/or video player, an application for controlling an air-conditioner, an application for controlling power windows, an application for controlling a seat heater, or any other application for accessing the plurality of onboard devices so as to control the operation of those devices or obtain sensed data from them.

According to another aspect of the disclosure, an apparatus for an application accessing a plurality of onboard devices in a vehicle is provided, which includes an onboard device manager for providing an uniform interface to connect the applications, registering the plurality of devices by assigning each device a device ID, when the application sends a message in a uniform format to at least one device of the plurality of devices, determining an address of each of the at least one device, determining a format of each of the at least one device based on the device ID of each of the at least one device included in the message, translating the message into the format of each of the at least one device, and sending the translated message to the corresponding device of the at least one device; and driver units of the plurality of onboard devices for connecting the plurality of onboard devices with the manager.

The onboard device manager may maintain a registration table, in which the device ID and the address of each of the plurality of devices are stored correspondingly with each other, and the manager may determine the address of each of the at least one device based on the device ID of each of the at least one device by using the registration table.

The onboard device manager may further receive a return message from each of the at least one device, determine the device ID of each of the at least one device based on an address of each of the at least one device, determine the format of each of the at least one device based on the device ID, translate the return message of each of the at least one device into the uniform format, and send the translated return message to the application.

In addition, the onboard device manager may determine the device ID of one of the plurality of devices based on an address of the one device when the one device sends the message to an application through a driver unit of the one device, determine a format of the message based on the device ID, translate the message into the uniform format, and send the translated message to the application through the uniform interface. The manager may determine the device ID based on an address of the one device by using a registration table, in which the device ID and the address of each of the plurality of devices are stored correspondingly with each other.

Furthermore, the onboard device manager may check the plurality of onboard devices to determine which is (are) active or inactive.

This disclosure provides a solution which enables applications to access all kinds of onboard devices (including sensors, controllers, etc.) uniformly, even these devices are made by different manufacturers and each has its specific device driver. A new protocol is introduced to define the message format for data exchange between applications and the device manager. Some advantages of this solution are as follows: it hides differences of onboard devices from applications and provides a uniform interface to applications, which enables applications to access all kinds of onboard devices in a uniform matter; it makes application development much easier than before since developers need not know details of onboard devices; when onboard devices are upgraded or newly introduced, the applications can still work well without any modification; and it improves the portability of applications because those applications can run on vehicles with different types of onboard devices.

Others systems, methods, features and advantages of the disclosure will be, or will become, apparent to one with skill in the art upon examination of the following figures and detailed description. It is intended that all such additional systems, methods, features, and advantages be included within this description, be within the scope of the disclosure, and be protected by the following claims.

BRIEF DESCRIPTION OF THE DRAWINGS

The disclosure can be better understood with reference to the following drawings and description. The components in the drawings are not necessarily to scale, emphasis instead being placed upon illustrating the principles of the disclosure. Moreover, in the figures, like reference numerals designate corresponding parts throughout the different views.

DETAILED DESCRIPTION

Figure 1:
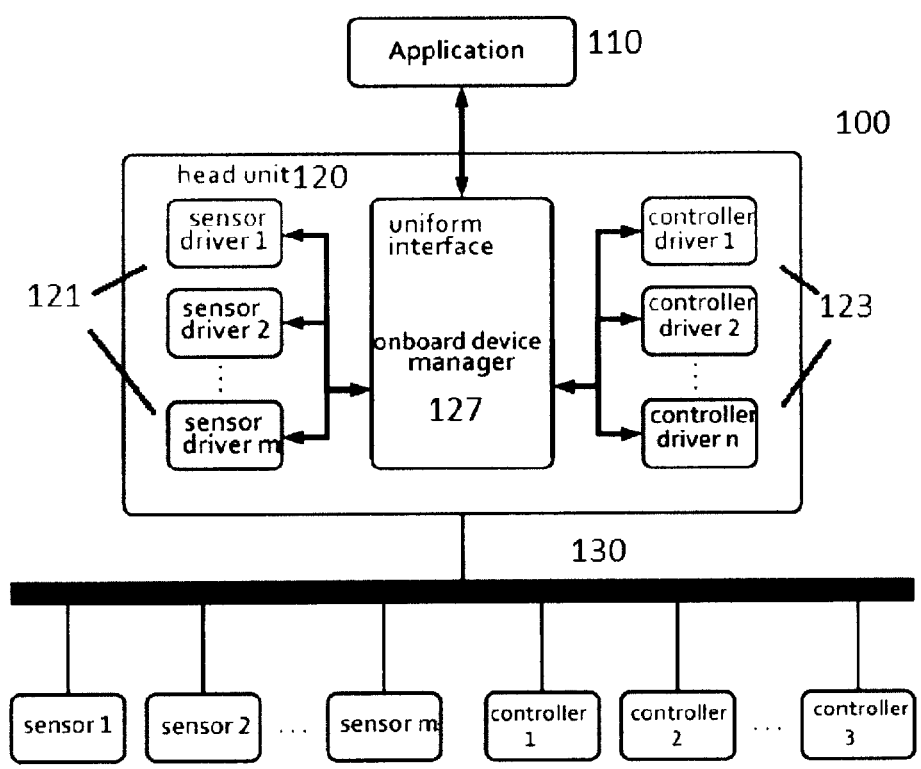
FIG. 1 illustrates a system for accessing onboard devices uniformly by using a head unit according to an embodiment of the present disclosure.

The present disclosure provides a method, an apparatus, and a system for accessing onboard devices uniformly according to an embodiment of the present disclosure. FIG. 1 shows a system 100 including applications 110, a head unit 120, and onboard devices 130.

The applications may include various applications for controlling onboard devices. For example, the applications may include one for opening the power window if the velocity is below a threshold and the outside temperature is in a pre-configured range or otherwise close the window, one for playing rock music if the velocity is beyond a threshold (e.g. 80 km/h), switching to some soft music if the velocity is below a threshold (e.g. 30 km/h), one for turning on/off the main headlamps if the environmental brightness is below/above some thresholds, etc.

The plurality devices may include various sensors for environment detection, such as, speedometer, fuel meter, radar, GPS devices, etc. and/or controllers for controlling vehicular equipment, such as, air-conditioner, power window, seat heater, camera, audio and video players, etc. The onboard devices may include any other types of devices as long as they can be used for the vehicle.

As shown in FIG. 1, the head unit 120 includes drivers 121, 123 for a plurality of the onboard devices 130, which may include sensors and controllers. The onboard devices 130 may have their respective drivers for driving them to operate, and may be interconnected with the head unit 120 through their drivers. The head unit 120 further includes an onboard device manager 127, which provides a uniform interface to connect the applications. The head unit 120 connects the applications 110 through the uniform interface. Although the system shown in FIG. 1 only presents sensors and controllers as onboard devices, it is appreciated for those skilled in the art that the onboard devices may include other types of devices.

Figure 2:
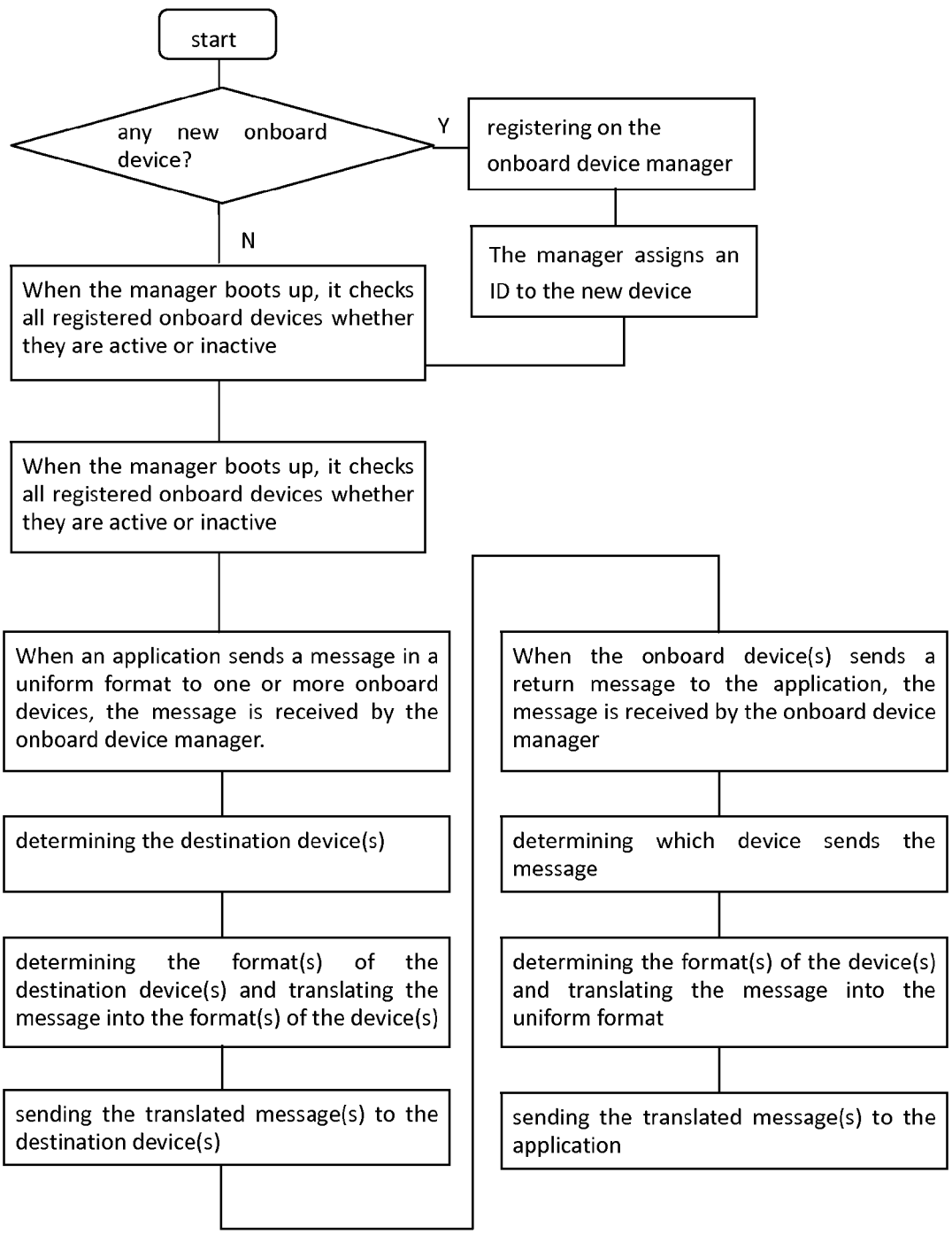
FIG. 2 illustrates a flow diagram representation of a method for accessing onboard devices by applying the system of FIG. 1.

As shown in FIG. 2, when an onboard device is added in the system 100, the onboard device needs to register on the onboard device manager. Then, the onboard device manager 127 obtains the information of the onboard device, such as, the device name, type, corresponding driver, etc. After that, the manager assigns an ID to the device. When the manager boots up, it may check all the registered onboard devices one by one to determine whether they are active or inactive. In order to identify the various onboard devices, the manager may maintain a registration information stored therein, such as, a registration table, in which the device ID and the device address (such as, MAC ID/address, device file, port number, IP address, etc) of each device is stored correspondingly with each other. When an application sends a message to a device, the onboard device manager 127 may find the device address from the registration table by checking the device ID included in the message. When a device sends a message to an application, the onboard device manager 127 may determine the device ID from the registration table by using the address of the device from which the message is sent.

The applications 110 can communicate with the onboard device manager 127 through the uniform interface defined by a protocol, which defines a uniform format of the messages exchanged between applications and the onboard device manager. The manager works as an agent of applications to access the onboard devices. When an application sends a message to one or more onboard devices, the message will be firstly received by the manager through the uniform interface before sending to the onboard devices.

Figure 3:
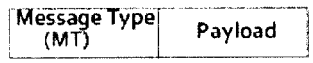
FIG. 3 illustrates examples of message formats for exchanging messages between the applications and the onboard device manager according to the embodiment of the present disclosure.
Figure 3:
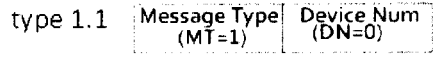
Figure 3:
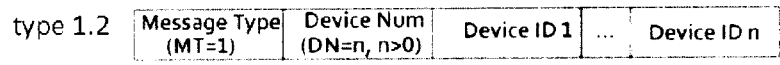
Figure 3:
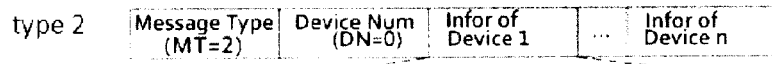
Figure 3:
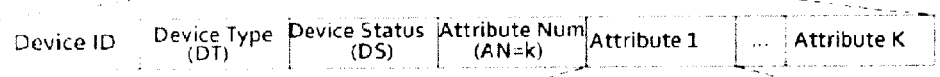
Figure 3:
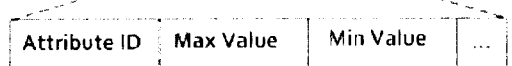
Figure 3:
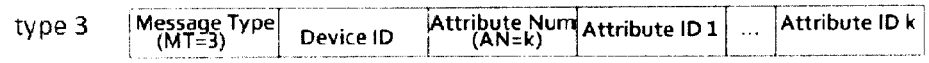
Figure 3:
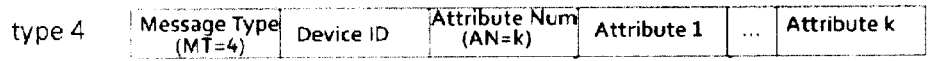
Figure 3:
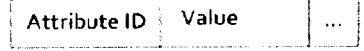
Figure 3:
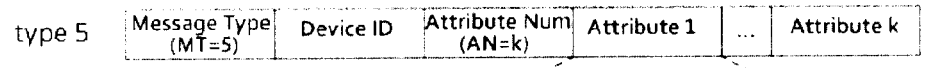
Figure 3:
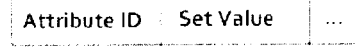
Figure 3:
Figure 3:
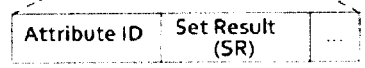

FIG. 3 shows some examples of the uniform format of the messages exchanged between the manager and the applications defined by the protocol. In general, the format includes at least two parts, i.e., message type (MT) and payload. The message types may be represented by numerals. For example, "1", "2", "3", "4", "5", and "6" represent "Device Info Request" (sending from application(s) to the manager to inquire information about onboard devices), "Device Info Response" (sending from the manager to the application(s) to feed back information about onboard device(s)), "Device Read Request" (sending from the application(s) to the manager to request detected environment parameters detected by the sensor(s)), "Device Read Response" (sending from the manager to the application(s) to feed back the environment parameter(s) obtained from the sensor(s)), "Device Control Request" (sending from the application(s) to the manager for controlling the equipment(s) of the vehicles through the corresponding controller(s), and "Device Control Response" (sending from the manager to the application(s) to feed back the control result of the controller(s)), respectively. FIG. 3 shows the examples of those types of messages. It is apparent to those of ordinary skill in the art that the message types do not limit to the aforesaid examples, and may be represented by other numbers or even other means.

As shown in FIG. 3, the payload may include different fields according to the different message types. Type 1.1 is an example of an Info Request, including the fields of MT and Device Num (DN) (payload), wherein MT=1, and DN=0. It may be defined that the information of all onboard devices should be fed back to the application if DN=0. As shown in type 1.2, when DN=n, n>0, it means that n onboard devices should feedback the required information to the application. The payload includes the fields for providing the device ID of each of the devices to be accessed.

The process for an application accessing onboard devices uniformly will be explained based on the following example in reference to FIGS. 2-3. This example relates to an application requesting the information about one or more onboard devices.

In particular, when an application sends a Device Info Request (see FIG. 3 for the example of the format) to an onboard device for inquiring information about the onboard device, the Device Info Request is received by the onboard device manager 127 through the uniform interface. After receiving this request, the manager analyzes this request to find the destination device to be accessed based on the device ID after checking the registration information (such as, registration table). After determining the destination device, the manager then determines the format used by the device, translates the Device Info Request into the format used by the corresponding device, and sends the translated request to the driver of the corresponding device. If there is more than one destination device, the manager may need to translate the Request into different formats used by different destination devices, and send them to those devices separately.

After receiving the request, the corresponding device (or devices) returns a message carrying its information to the manager through its driver. The manager determines which device sends it the message by the driver, checks the registration information (such as, a registration table) to obtain the device ID, determines the format of the message based on the device ID, and translates it into a Device Info Response in the uniform format as type 2 shown in FIG. 3. Type 2 includes the field of MT, the field of DN, and the field(s) for carrying the information of the corresponding device(s) (Info of Device). If the application requests the information of more than one device, the Device Info Response will include the information of all devices required by the application. As shown in type 2, the device information may include device ID, device type (DT) (e.g., "1" represents sensor, "2" represents controller), device status (DS) (e.g., "1" represents active, "0" represents inactive), attribute number, and specific attribute(s), etc. Each attribute may include attribute ID, max value, and min value, etc. The device types are not limited to sensor and controller, and thus the parameter of Device Type (DT) may be set to values other than 1 and 2 if new types of devices are added. For the device status (DS), there may be some inactive states of devices: unconnected; powered off; device errors; out of work condition, etc. If a device is inactive, the applications may not access it until it recovers to the active status.

Similarly, as shown in FIG. 3, types 3 and 5 are examples of Device Read Request and Device Control Request sent from the application to the manager, and types 4 and 6 are examples of Device Read Response and Device Control Response sent from the manager to the application.

The types of messages are not limited to the aforesaid examples, and the fields of the messages and the parameters of those fields are not limited to the aforesaid examples. Under some circumstances, some onboard devices may initiate the session with an application. For instance, when the speedometer detects that the speed of the vehicle exceeds a threshold, it may send a message to an application so as to warn the driver of overspeed, or when the sensors on the vehicle detects that the vehicle is very close to other vehicles, those sensors may send a message to an application so as to warn the driver of the situation by sound, light, image, and/or any other means. For example, the aforesaid types 4 and 6 may be used for the messages initiated from onboard devices if the devices are capable of reporting their status periodically. Thus, the process for an application sending a message to an onboard device and the process for an onboard device sending a message to an application as shown in FIG. 2 may be performed independently.

It is seen from the aforesaid embodiment that after translation of the message by the manager, the applications may access onboard devices though a uniform interface with a uniform format, and the differences of onboard devices are hidden by the manager. The applications may be developed without knowledge of the details of the onboard devices.

Figure 4:
FIG. 4 illustrates an example for obtaining the temperature and controlling the air conditioner by an application according to the embodiment of the present disclosure.

FIG. 4 provides a more specific example of using the process shown in FIG. 2 and the format shown in FIG. 3 to collect the information from the onboard devices and send the message to control the onboard devices. In this example, the onboard devices are a temperature sensor and an air conditioner controller. In process 1, the application sends a message ("Device Info Request") for collecting the information of all onboard devices since MT=1 and DN=0. This message is translated by the manager and sent to the temperature sensor and the air conditioner controller based on the process shown in FIG. 2. Those two devices return the information to the manager, and the manager translates the information into a message in the uniform format as "Device Info Response". The device ID "0001" indicates the temperature sensor, whose detection range is 50 to 200 degree.

The device ID "0002" indicates the air conditioner controller, attribute 1 indicates its switch having two status values, i.e., turning on (value=1) or turning off (value=0), attribute 2 indicates its temperature range (15 to 30 degree). Both devices are active. Furthermore, the functions/description of the devices may be incorporated in "other parameters". For instance, there may be other contents in "Info of Device", which may be referred to as attributes of the device. Likewise, there also may be other parameters of attributes included in the "Info of Device". For example, in the message of type 2, "Step Value" may be added as an attribute.

After receiving the aforesaid "Device Info Response", in process 4, the application sends a message as "Device Read Request" to the manager to read the temperature from a temperature sensor every minute. After receiving the temperature from the temperature sensor, the manager translates it into "Device Read Response" (see FIG. 3) by using the uniform format, and sends the translated message to the application.

If the temperature is above 28° C. or below 18° C., the application sends a message as "Device Control Request" to the manager to turn on the air conditioner (i.e. attribute 1=1), and set the temperature to 25° C. (i.e. attribute 2=25). After receiving the translated message from the manager, the air conditioner controller will control the air conditioner according to this message, and will return the operation results to the application, for example, the operations are successful. The return message translated by the manager is shown in process 6 in FIG. 4, which is translated as a "Device Control Request".

It will be understood by persons skilled in the art, that one or more processes or sub-processes described in connection with FIGS. 1-4 may be performed by hardware and/or software. If the process is performed by software, the software may reside in software memory (not shown) in a suitable electronic processing component or system. The software in the memory may include executable instructions for implementing logical functions (that is, "logic" that may be implemented either in digital form such as digital circuitry or source code or in analog form such as analog circuitry or an analog source such as an analog electrical signal), and may selectively be embodied in any computer-readable medium for use by or in connection with an instruction execution system, apparatus, or device. The computer readable medium may selectively be, for example, but is not limited to, an electronic, magnetic, optical, electromagnetic, infrared, or semiconductor system, apparatus or device, such as, a RAM, a ROM, an EPROM, etc.

While various embodiments of the disclosure have been described, it will be apparent to those of ordinary skill in the art that many more embodiments and implementations are possible that are within the scope of the disclosure. Accordingly, the disclosure is not to be restricted except in light of the attached claims and their equivalents.

The invention claimed is:

1. A method for accessing a plurality of onboard devices of a vehicle with an onboard device manager, the method comprising:
    connecting to the plurality of onboard devices;
    registering the plurality of onboard devices by assigning each device a device ID;
    connecting to an application via a uniform interface;
    responsive to the application sending a message to a device of the plurality of onboard devices:
        receiving the message,
        determining the device ID and a format of the device according to the message,
        translating the message into the format of the device,
        sending the translated message to the device, wherein the message sent by the application includes a message type field and a device number field,
        sending a response message, received from the device, to the application according to message type, and
        if the message sent from the application requests for more than one device to each return the response message, receiving the response message from each of a plurality of devices, translating the response messages of each of the plurality of devices into a single response message with a uniform format, and sending the single response message to the application.

2. The method of claim 1, further comprising determining, with the onboard device manager, an address of the device based on the device ID of the device by using a registration table, in which the device ID and the address of each of the plurality of onboard devices are stored correspondingly with each other.

3. The method of claim 1, further comprising determining, with the onboard device manager, the device ID of the device based on an address of the device after receiving the response message from the device, and determining the format of the device based on the device ID.

4. The method of claim 1, further comprising, responsive to a new onboard device being connected to the onboard device manager, registering the new onboard device on the onboard device manager so as to be accessed by the application without changing the application.

5. The method of claim 1, wherein at least one of the plurality of onboard devices initializes a session with the application.

6. The method of claim 1, further including checking, with the onboard device manager, the plurality of onboard devices to determine which is active or inactive.

7. The method of claim 1, wherein the uniform format further comprises a payload field.

8. The method of claim 1, wherein the message sent from the application to the device is a device information request, a device read request, or a device control request.

9. The method of claim 1, wherein the single response message sent from the device to the application is a device information response, a device read response, or a device control response.

10. The method of claim 1, wherein the plurality of onboard devices includes any of an air-conditioner controller, a power window controller, a seat heater controller, a camera controller, an audio and/or video player controller, a speedometer, a fuel meter, a radar, and a GPS device.

11. An apparatus for an application accessing a plurality of onboard devices in a vehicle, the apparatus comprising:
    an onboard device manager for providing a uniform interface to connect to the application, and to connect to and register the plurality of onboard devices by assigning each of the plurality of onboard devices a device ID; and
    one or more driver units of the plurality of onboard devices for connecting the plurality of onboard devices to the manager,
    wherein, responsive to the application sending a message to a device of the plurality of onboard devices, the onboard device manager is configured to:
        receive the message, determine the device ID and a format of the device according to the message, translate the message into the format of the device, and send the translated message to the device, wherein the message sent by the application includes a message type field and a device number field;

wherein the device is configured to send a response message to the application via the onboard device manager according to a message type indicated in the message type field; and if the message sent from the application requests that a plurality of selected devices of the plurality of onboard devices each returns the response message, the onboard device manager is configured to receive the response message from each of the selected devices, translate the response messages of each of the selected devices into a single response message with a uniform format, and send the single response message to the application.

12. The apparatus of claim 11, wherein the onboard device manager is configured to maintain a registration table, in which the device ID and an address of each of the plurality of onboard devices are stored correspondingly with each other, and the onboard device manager is configured to determine the address of the device based on the device ID of the device.

13. The apparatus of claim 11, wherein the onboard device manager is configured to determine the device ID of the device based on an address of the device after receiving a response message from the device and determine the format of the device based on the device ID.

14. The apparatus of claim 11, wherein responsive to a new onboard device being connected to the onboard device manager, the onboard device manager is configured to register the new onboard device such that the new onboard device is accessible by the application without changing the application.

15. The apparatus of claim 14, wherein at least one of the plurality of onboard devices is configured to initialize a session with the application.

16. The apparatus of claim 11, wherein the onboard device manager checks the plurality of onboard devices to determine which of the plurality of onboard devices are active or inactive.

17. The apparatus of claim 11, wherein the uniform format further comprises a payload field.

18. The apparatus of claim 11, wherein the message sent from the application to the device is a device information request, a device read request, or a device control request.

19. The apparatus of claim 13, wherein the response message sent from the device to the application is a device information response, a device read response, or a device control response.

20. The apparatus of claim 11, wherein the plurality of onboard devices includes any of an air-conditioner controller, a power window controller, a seat heater controller, a camera controller, an audio and/or video player controller, a speedometer, a fuel meter, a radar, and a GPS device.

* * * * *